United States Patent [19]

Gamblin et al.

[11] 4,207,579

[45] Jun. 10, 1980

[54] RECIPROCATING PAPER HANDLING APPARATUS FOR USE IN AN INK JET COPIER

[75] Inventors: Rodger L. Gamblin; George Marinoff, both of Dayton, Ohio

[73] Assignee: The Mead Corporation, Dayton, Ohio

[21] Appl. No.: 1,716

[22] Filed: Jan. 8, 1979

[51] Int. Cl.² .................... G01D 15/18; G01D 15/28

[52] U.S. Cl. ........................................ 346/75; 271/7; 271/197; 271/DIG. 9; 346/134

[58] Field of Search ...................... 346/75, 134; 271/7, 271/6, 12, 196, 197, 198, 276, DIG. 9; 355/14 SH

[56] References Cited

U.S. PATENT DOCUMENTS

| | | | |
|---|---|---|---|
| 2,816,160 | 12/1957 | Young | 271/197 X |
| 3,698,706 | 10/1972 | Mihojevich | 271/197 X |
| 3,703,628 | 11/1972 | Philipson | 346/75 X |
| 3,980,294 | 9/1976 | Heinzer | 271/197 |
| 4,063,254 | 12/1977 | Fox | 346/75 |
| 4,112,469 | 9/1978 | Paranjpe | 346/75 X |

*Primary Examiner*—Joseph W. Hartary

*Attorney, Agent, or Firm*—Biebel, French & Nauman

[57] ABSTRACT

A paper handling system capable of providing a single or multiple pass of a printing medium by an ink jet printing head for the reproduction of original documents utilizes an endless conveyor belt to support the printing medium. The belt can be driven both forwardly and in reverse to cycle the printing medium under a printing head which prints tracks of information onto the medium. After each cycle, the printing head is advanced in a direction transverse to the motion of the printing medium until complete coverage of the printing medium is achieved. Either an interlace or band printing scheme can be used.

9 Claims, 3 Drawing Figures

RECIPROCATING PAPER HANDLING APPARATUS FOR USE IN AN INK JET COPIER

BACKGROUND OF THE INVENTION

This invention relates to copying and duplicating devices, and more particularly, to such devices wherein recording is accomplished by means of a noncontact jet drop print head. A number of such devices are shown in the prior art as shown, for instance, by Ranger et al, U.S. Pat. No. 1,817,098, Behane et al, U.S. Pat. No. 3,604,846, and Loughren, U.S. Pat. No. Re. 27,555. Each of these prior art devices supports a copy sheet on a rotating drum, across which a jet drop print head is translated. A somewhat different arrangement is disclosed in Taylor, U.S. Pat. No. 3,564,120, where a plurality of jet drop print heads are scanned in rotary arcs over a print receiving paper being transported in a horizontal plane. These prior art devices are so configured that they are generally adaptable for use in an office copying or duplicating environment. However, they are all considered to be too slow for most office copying requirements.

A faster copier is disclosed in Cahill et al, U.S. Pat. No. 3,689,693, which uses a plurality of jet drop print heads, typically eight, to cooperatively print portions of an original and collectively print an entire reproduction of an original document. This reduces the printing time significantly, but the system is somewhat limited by the fact that it has only one printing nozzle per head. An even faster printer is disclosed by Van Hook, U.S. Pat. No. 4,009,332, which employs multiple nozzle heads which print interlaced helical tracks.

However, both of these devices require the attachment of a printing medium such as paper to a rotating drum which then must rotate a desired number of revolutions under a printing head to accomplish the reproduction of an original document. Paper handling systems for loading and unloading paper onto the drum, combined with different speed of rotation requirements for the drum at different stages of processing, renders these rotating drum systems complex and adversely affects the overall reliability of the system. Accordingly, the need exists in the art for a simple and reliable paper handling system capable of providing a single or multiple pass of a printing medium such as copy paper under an ink jet printing head for the reproduction of original documents.

SUMMARY OF THE INVENTION

In accordance with the present invention a printing medium such as copy paper is fed onto an endless conveyor belt, which is preferably porous. A vacuum plenum chamber is positioned below the upper side of the belt and provides a means for holding the printing mediuum onto the belt. The belt may be made to operate in either a forward or reverse direction through use of drive means such as two servo motor devices attached to the conveyor belt.

An ink jet printing head is positioned above the belt and has a direction of movement perpendicular to the line of belt movement (and thus print medium movement). Copying is accomplished by reciprocating the printing medium under the printing head for a predetermined number of cycles. This number may vary depending upon the number of orifices used for printing in the printing head, the desired degreee of resolution, and the system copy rate. After each pass of the printing medium under the printing head, the head is indexed in a direction perpendicular to the direction of movement of the printing medium a predetermined distance. This distance is also variable and will depend upon whether or not printing is to be accomplished by printing discrete bands or is to be interlaced with printing from previous cycles. Printing is laid down during both the forward and reverse movement of the printing medium. When used in conjunction with known document scanning and print control techniques, the printing media handling system of the present invention provides an efficient and reliable means of copying documents.

It is also desirable that the system be designed to print a complete copy in an odd number of cycles. In this manner, printing will be completed at the end of the forward motion portion of the cycle, the finished copy can be ejected into a receiver, and a new sheet of copy material can be fed onto the belt while the printing head is indexed back to its initial starting position.

In an alternative embodiment of the invention, it is possible to have a stationary printing head which is the full width of the printing medium. A complete copy may be printed on a single pass of the printing medium under the printing head.

DESCRIPTION OF THE PREFERRED EMBODIMENTS

Figure 1:
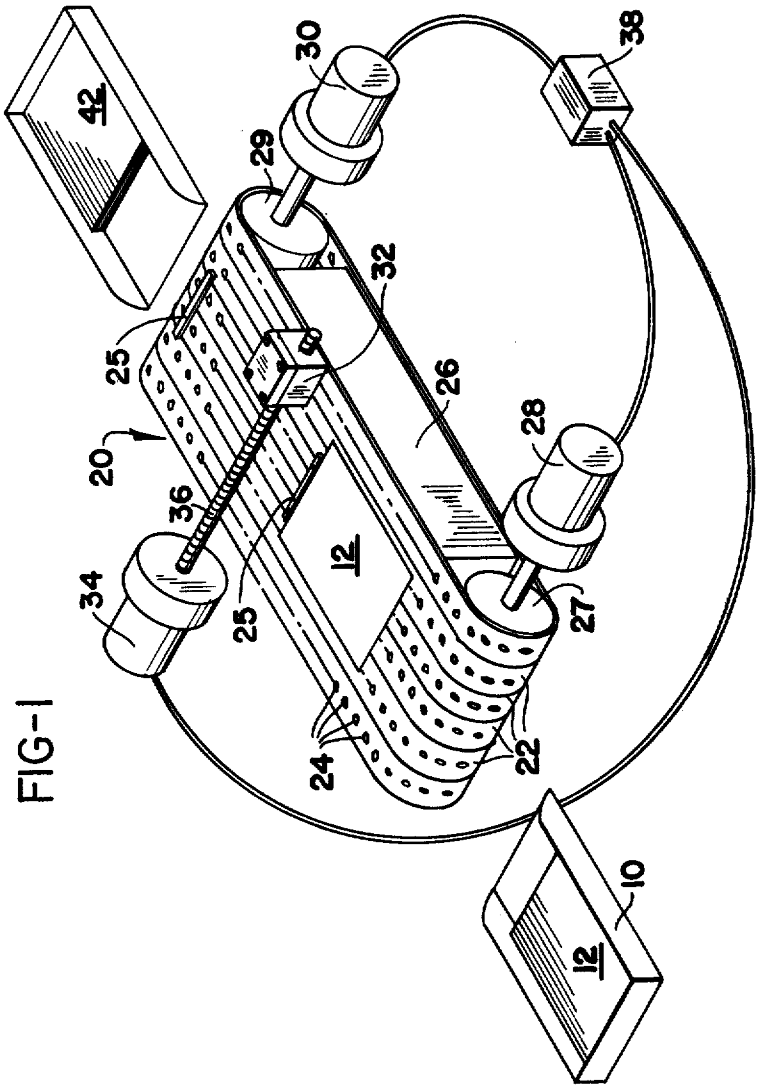
FIG. 1 is a perspective view of the major components of the copier system.

As generally illustrated by FIG. 1, a printing medium such as paper 12 is stored and fed from paper feeder 10. Individual sheets of paper 12 are fed in a known manner (by an arrangement not shown) onto the paper handling system 20. Paper handling system 20 comprises a series of endless belts 22 having perforations 24 therein. Alternatively, the belts may be fabricated of materials sufficiently porous so that a vacuum applied from plenum chamber 26 underneath belts 22 will be sufficient to hold individual sheets of paper 12 in place during the printing operation. In still a different embodiment, a single belt may be used as the support means for the paper.

Belts 22 are driven by synchronous drive motors 28 and 30 attached to rollers 27 and 29, respectively. When sheet 12 is fed onto the conveyor belt, it is advanced until its leading edge registers against a clip 25. A vacuum is then pulled through chamber 26 and belt 22 to maintain sheet 12 in proper position throughout the copying process. Motor 30 drives roller 29 so that the conveyor belt and sheet 12 are advanced forward toward a line formed by the intersection of a vertical plane extending from the printing head to the conveyor belt. Printing is commenced when sheet 12 reaches this line and continues until the first informaton track has been printed along the entire length of the sheet. Forward drive motor 30 then disengages to permit advancing motor 34 to index print head 32 a predetermined distance transverse to the direction of flow of sheet 12. After indexing is completed, reverse drive motor 28 engages roller 27 and sheet 12 is passed in the opposite direction under printing head 32 for another information track to be printed. As will be more fully explained below, there are several alternative methods of printing these tracks.

Figure 2:
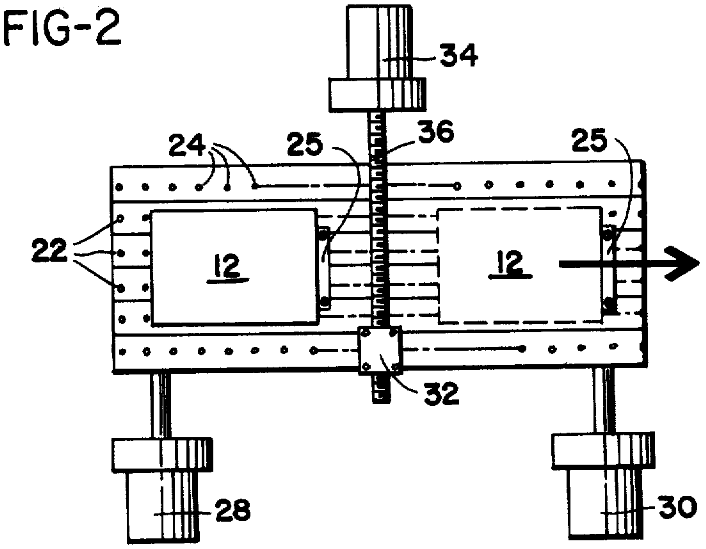
FIG. 2 is a top view of the conveyor belt and drive mchanism and shows the positioning of the printing head with respect to the printing medium.

After the sheet 12 has traversed a predetermined number of cycles under printing head 32, copying is completed, and the sheet is indexed forward by forward drive motor 30 and ejected into paper receiver 40 which is capable of holding a multiple number of completed copies 42. Preferably, copying will be completed in an odd number of cycles so that as sheet 12 is indexed forward off belts 22 and into paper receiver 40, a new sheet is being loaded onto the conveyor from paper feeder 10. This is best illustrated in FIG. 2 where a completed copy is advanced forwardly off of belts 22 while a new sheet 12 is loaded onto belts 22. Stop bars 25 are positioned along belts 22 to provide correct spacing between sheets.

Figure 3:
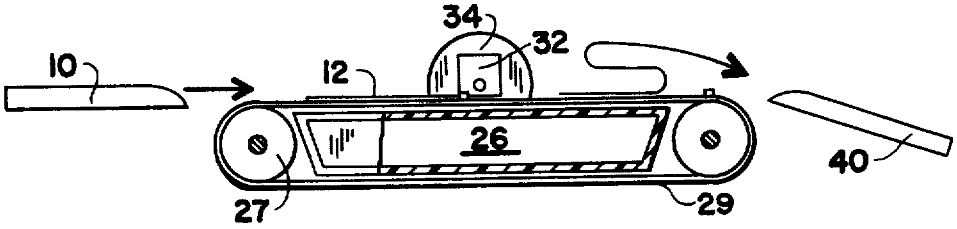
FIG. 3 is a side view of the copier system.

As shown by the arrows in FIG. 3, a sheet 12 is loaded from paper feeder 10 onto the conveyor belt and held in position by a vacuum pulled from chamber 26. Forward and reverse drive motors rotate rollers 27 and 29 so that sheet 12 travels back and forth under printing head 32. After copying is completed, sheet 12 is advanced forwardly in paper receiver 40.

In an alternate embodiment, printing head 32 may extend the entire width of sheet 12. As sheet 12 passes under the stationary printing head, copying is completed in a single pass. Orifices in the printing head may be arranged in either a single row or in a double row, one row offset from the other, from which streams of ink drops will fall on sheet 12.

Printing head 32 is preferably of laminar construction as generally taught by Beam et al, U.S. Pat. No. 3,586,907, and produces an array of longitudinally spaced jets. As indicated above, if desired, the printing head may have two parallel rows of orifices from which jets are produced, one row slightly offset from the other, as taught by Mathis, U.S. Pat. No. 3,701,998. Typically geometry of the orifices is 0.04 mm diameter orifices spaced on 0.5 mm centers. Details of drop stimulation are taught by the above mentioned Beam et al and Mathis patents as well as by Lyon et al, U.S. Pat. No. 3,739,393, which are incorporated by reference.

Printing head 32 is supported on a worm 36 driven by a synchronous drive motor 34 under the direction of a control unit 38. The pitch of worm 36 and the speed of motor 34 may be varied to produce the desired amount of transverse movement in printing head 32. Movement of belts 22 by the forward and reverse motors is also controlled by control unit 38 in conjunction with drive motor 34 to provide proper timing and movement of sheet 12 and printing head 32. Control unit 38 is also adapted to be connected to a scanning device generally of the type shown in Paranjpe et al, U.S. Pat. No. 4,112,469 but modified to have bidirectional motion of the scanning mirror. Scanning of a document to be copied may be coupled with simultaneous printing of the informaton scanned as taught in the above mentioned Paranjpe et al patent.

It will be appreciated that the resolution obtaned in the printed copy is a function of the size of the ink drops and the inter-drop spacing on the print medium. A number of different approaches have been taken to increase the resolution obtainable. For example, multiple rows of jets may be used in the printing head with each row servicing print lines on the print medium which interlace with the print lines serviced by a different row of jets. In another approach, jets may be spaced apart by substantial distances and the print medium repeatedly passed under the printing head. After a sufficient number of passes (with the printing head being advanced a preset distance after each pass), each jet will have serviced a number of print lines on the print medium sufficient to form a band of width equal to the inter-jet spacing. Such an arrangement is shown in a rotary drum copier environment by Cahill et al, U.S. Pat. No. 3,689,693.

Paranjpe et al, U.S. Pat. No. 4,112,469, uses an interlace printing method using one or more jet arrays moving axially along a rotating drum upon which a copy sheet is attached. In an array having n nozzles spaced k resolution elements apart, the nozzle array is advanced axially by n resolution elements during each revolution of the drum. The numbers n and k are chosen so that they have no prime factors in common greater than unity. Rotation of the drum and axial movement of the array result in an interlace pattern of print lines which are slightly inclined with respect to the copy paper. Other interlace printing schemes have also been used in a rotary drum copier environment. Among them are commonly assigned applications Ser. Nos. 833,579, filed Sept. 15, 1977 now U.S. Pat. No. 4,131,898, and 867,669, filed Jan. 9, 1978, to Gamblin. Any of the above printing schemes may be readily modified to operate in the conveyor belt system of the present invention. The particular printing scheme chosen will depend upon the type of printed matter on documents to be copied and the desired resolution to be obtained.

While the apparatus and methods described herein constitute preferred embodiments of the invention, it is to be understood that the invention is not limited to these precise forms of apparatus and methods, and that changes may be made therein without departing from the scope of the invention.

What is claimed is:

1. Printing media handling system for jet drop printing apparatus for copying or duplicating comprising:
   - flat support means for supporting a sheet to be printed,
   - paper feeding means for feeding said sheet to said flat support means,
   - rotary drive means for driving said flat support means in both a forward and reverse direction,
   - a printing head positioned above said flat support means and including an orifice plate provided with a series of orifices defining an array of jet printing nozzles for generating an array of parallel jets to print a series of tracks of image information on said sheet on said flat support means,
   - advancing means for advancing said printing head in a direction generally transverse to the direction of movement of said flat support means, and
   - a paper receiving means for receiving said sheet from said flat support means after completion of printing thereon.

2. The system of claim 1 where said flat support means comprises a porous endless conveyor belt.

3. The system of claim 2 including a vacuum plenum chamber positioned under the upper surface of said porous conveyor belt.

4. The system of claim 3 where said rotary drive means comprise two synchronous motors, one adapted to drive said conveyor belt in a forward direction and one adapted to drive said conveyor belt in a reverse direction.

5. The system of claim 3 including control means to control and coordinate the operation of said rotary drive means with said advancing means.

6. The system of claim 5 where said printing head prints a track of image information on said sheet for each pass of said sheet under said print head.

7. The system of claim 6 where the frequency of repetitive movement of said sheet past said printing head is so related to the speed of advance of said printing head by said advancing means that successive sets of printed tracks are shifted by a distance equal to the width of one of said tracks multiplied by the number of nozzles in said printing head.

8. The system of claim 1 where said advancing means advances said printing head in a direction substantially perpendicular to the direction of movement of said flat support means.

9. A paper handling system for a jet drop printing apparatus for copying or duplicating comprising:

a flat, porous, endless conveyor belt having a vacuum plenum chamber positioned thereunder for supporting a sheet of paper to be printed, paper feeding means for feeding said sheet to said conveyor belt, two synchronous motors connected to said conveyor belt, one adapted to drive said conveyor belt in a forward direction and one adapted to drive said conveyor belt in a reverse direction, a printing head positioned above said conveyor belt and including an orifice plate provided with a series of orifices defining an array of jet printing nozzles for generating an array of parallel jets to print a series of tracks of image information on said sheet on said conveyor belt, a worm gear connected to said printing head and driven by a drive motor for advancing said printing head in a direction generally transverse to the direction of movement of said conveyor belt, paper receiving means for receiving said sheet from said conveyor belt after completion of printing thereon, and control means to control and coordinate the operation of said synchronous motors and the movement of said printing head, whereby said sheet is repetitively passed under said printing head and tracks of information are printed on each successive pass.

* * * * *